(12) United States Patent
Jurczyk

(10) Patent No.: US 9,989,158 B2
(45) Date of Patent: Jun. 5, 2018

(54) VALVE

(71) Applicant: LB Bentley Limited, Stroud, Gloucestershire (GB)

(72) Inventor: Krzysztof Jurczyk, Stroud (GB)

(73) Assignee: LB Bentley Limited, Stroud, Gloucestershire (GB)

( * ) Notice: Subject to any disclaimer, the term of this patent is extended or adjusted under 35 U.S.C. 154(b) by 0 days. days.

(21) Appl. No.: 15/311,003

(22) PCT Filed: May 15, 2015

(86) PCT No.: PCT/GB2015/051441
§ 371 (c)(1),
(2) Date: Nov. 14, 2016

(87) PCT Pub. No.: WO2015/173586
PCT Pub. Date: Nov. 19, 2015

(65) Prior Publication Data
US 2017/0108125 A1    Apr. 20, 2017

(30) Foreign Application Priority Data
May 15, 2014   (GB) .................................. 1408647.4

(51) Int. Cl.
*F16K 3/08* (2006.01)
*F16K 3/32* (2006.01)
(Continued)

(52) U.S. Cl.
CPC ................. *F16K 3/08* (2013.01); *F16K 3/32* (2013.01); *F16K 1/18* (2013.01); *F16K 1/20* (2013.01);
(Continued)

(58) Field of Classification Search
CPC ..... F16K 3/08; F16K 3/32; F16K 3/10; F16K 1/18; F16K 1/20; F16K 1/228; F16K 27/045; G05D 7/06; G05D 16/20
See application file for complete search history.

(56) References Cited

U.S. PATENT DOCUMENTS 3,923,284 A * 12/1975 Stickler ...................... F16K 3/08
251/172
4,946,134 A * 8/1990 Orlandi ...................... F16K 3/08
137/625.31
(Continued)

FOREIGN PATENT DOCUMENTS

EP   0325200    7/1989
GB   2340917    3/2000
(Continued)

OTHER PUBLICATIONS

Search Report for Great Britain Patent Application No. GB1408647.4 dated Jun. 3, 2014.
(Continued)

*Primary Examiner* — Matthew W Jellett
*Assistant Examiner* — Christopher Ballman
(74) *Attorney, Agent, or Firm* — Andrus Intellectual Property Law, LLP

(57) ABSTRACT

A valve is described including a valve seat defining a first port and a second port and an angularly movable valve member having a first face and a second face. The valve member is movable between a closed position in which the first face thereof, or a valve element associated therewith, closes at least one of the ports and an open position. The valve member defines a first flow passage and a second flow passage, each flow passage communicating with a chamber defined, at least in part, by the second face of the valve member. At least the first flow passage defines or includes a
(Continued)

flow director to impart a circumferential or tangential component to the fluid flow therethrough.

17 Claims, 3 Drawing Sheets

(51) Int. Cl.
| | |
|---|---|
| G05D 7/06 | (2006.01) |
| F16K 3/06 | (2006.01) |
| F16K 1/20 | (2006.01) |
| G05D 16/20 | (2006.01) |
| F16K 1/18 | (2006.01) |
| F16K 3/10 | (2006.01) |
| F16K 27/04 | (2006.01) |
| F16K 1/228 | (2006.01) |

(52) U.S. Cl.
CPC ............... *F16K 1/228* (2013.01); *F16K 3/06* (2013.01); *F16K 3/10* (2013.01); *F16K 27/045* (2013.01); *G05D 7/06* (2013.01); *G05D 16/20* (2013.01)

(56) References Cited

U.S. PATENT DOCUMENTS

| 5,010,917 | A | * | 4/1991 | Iqbal | F16K 3/08 |
| | | | | | 137/454.6 |
| 5,150,737 | A | * | 9/1992 | Clerc | F16K 3/08 |
| | | | | | 137/625.3 |
| 5,918,626 | A | * | 7/1999 | Strong | E03C 1/04 |
| | | | | | 137/454.5 |
| 2005/0126643 | A1 | * | 6/2005 | Romero | F16K 3/08 |
| | | | | | 137/606 |
| 2008/0083898 | A1 | * | 4/2008 | Chen | F16K 3/08 |
| | | | | | 251/208 |
| 2009/0038686 | A1 | * | 2/2009 | Lin | F16K 3/08 |
| | | | | | 137/39 |
| 2009/0057590 | A1 | | 3/2009 | Kok-Hiong et al. | |
| 2009/0189108 | A1 | * | 7/2009 | Ritter | E03C 1/0403 |
| | | | | | 251/304 |
| 2010/0301250 | A1 | * | 12/2010 | Kee | F16K 3/08 |
| | | | | | 251/309 |
| 2011/0114864 | A1 | * | 5/2011 | Wu | F16K 3/08 |
| | | | | | 251/321 |
| 2014/0048628 | A1 | * | 2/2014 | Korb | E03C 1/08 |
| | | | | | 239/581.1 |
| 2015/0276070 | A1 | * | 10/2015 | Yokoe | F16K 31/535 |
| | | | | | 251/248 |

FOREIGN PATENT DOCUMENTS

| JP | H0650450 | 2/1994 |
| WO | 2010020741 A1 | 2/2010 |
| WO | 2012125506 A2 | 9/2012 |

OTHER PUBLICATIONS

International Search Report and Written Opinion for International Application No. PCT/GB2015/051441 dated Jun. 24, 2015.

* cited by examiner

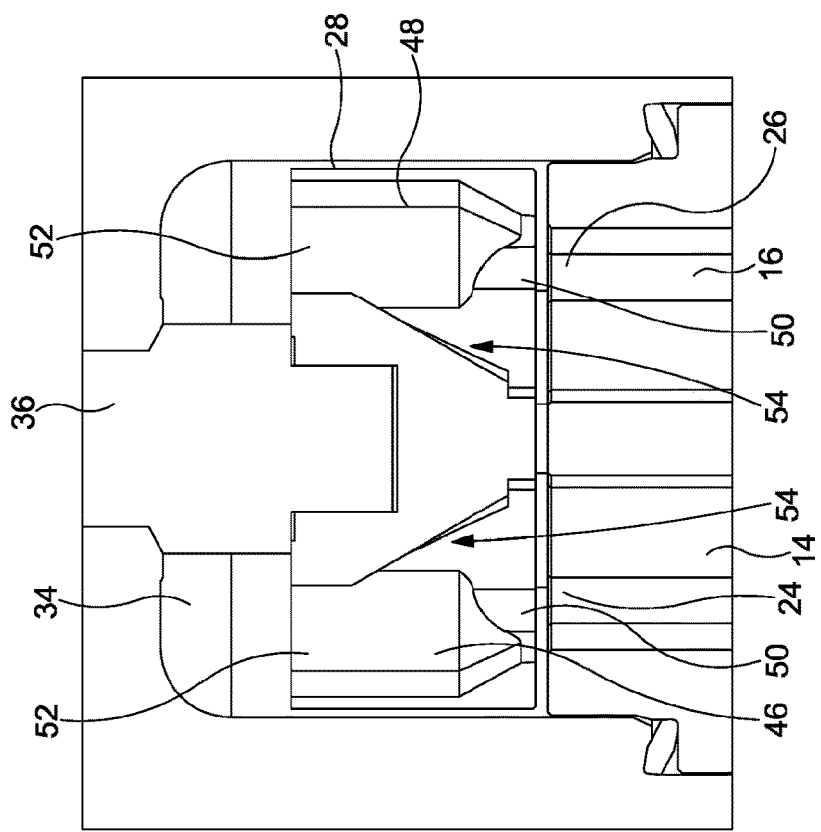
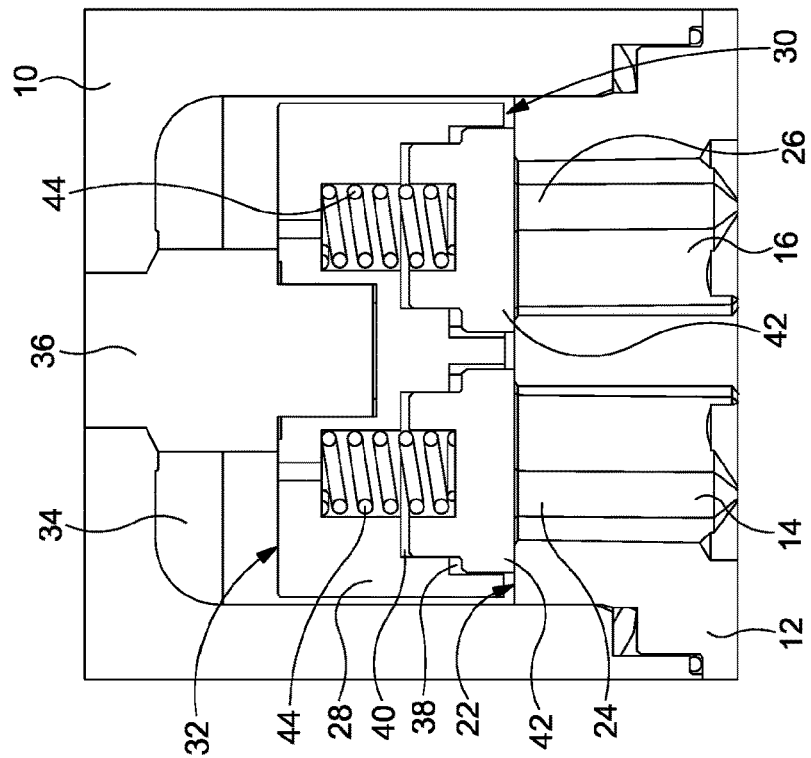

1-1
ROUND PORTS 2-2
TRANSITION FROM ROUND
TO SHAMROCK
SHAPED PORTS 3-3
SHAMROCK
SHAPED PORTS 4-4
TRANSITION FROM SHAMROCK
TO KIDNEY SHAPED PORTS 5-5
KIDNEY
SHAPED PORTS

VALVE

CROSS-REFERENCE TO RELATED APPLICATIONS

This application is the U.S. national stage application of International Application PCT/GB2015/051441, filed May 15, 2015, which international application was published on Nov. 19, 2015, as International Publication WO 2015/173586 A1 in the English language. The International Application claims priority of Great Britain Patent Application 1408647.4, filed May 15, 2014.

FIELD

This invention relates to a valve, and in particular to a rotary gate valve.

BACKGROUND

Rotary gate valves are well known. For example, British patent number GB2340917 describes a rotary gate valve comprising a housing that supports or defines a valve seat and contains a valve gate member. The valve seat has an inlet port and an outlet port, and fluid communication therebetween is controlled by the valve gate member. The valve gate member is angularly moveable between a closed position in which it seals at least one of the inlet and outlet ports, and an open position in which fluid can flow between the inlet and outlet ports, via the valve gate member. A contacting face of the valve gate member is maintained in sliding contact with the valve seat throughout the range of movement (from closed to open positions), and the contacting face of the valve gate member forms a metal to metal seal with the valve seat in the closed position. In some arrangements, the valve gate includes at least one gate button, each of which comprises a circular contacting face. Each gate button has a circular cross section, and the circular contacting face is larger in diameter than the circular port of the valve seat that is sealed thereby in the closed position. The gate buttons are spring biased into engagement with, and so exert a load on, the valve seat. In the fully closed position, the circular contacting face of the gate button is concentric with the circular port that it seals.

In such an arrangement, the valve gate member includes a pair of flow passages which substantially align, when the valve gate member occupies its fully open position, with the inlet and outlet ports. The flow passages open into a chamber located to the opposite side of the valve gate member from the valve seat. It will be appreciated, therefore, that when the valve gate member occupies an open position, fluid is able to flow from the inlet port to the above mentioned chamber via the flow passage that is substantially aligned with the inlet port, and from the above mentioned chamber through the other of the flow passages to the outlet port.

Depending upon the application in which the valve is used, fluid may further be permitted to flow in the reverse direction.

It will be appreciated that in flowing between the inlet and outlet ports in the manner described above, the fluid must undertake several very sharp changes in direction, for example as it flows between the passages and the chamber. Furthermore, the movement of the gate valve member between its open and closed positions is typically transmitted thereto via a shaft or spindle extending through the above mentioned chamber, and so further fluid flow direction changes must be undertaken in order for the fluid to pass around the shaft or spindle.

The fluid flow direction changes may result in increased turbulent fluid flow within the gate valve. Potentially, parts of the valve may be damaged by erosion or increased wear. Furthermore, and importantly, the sharp changes in flow direction can result in the formation of a restriction to fluid flow and so reduce the rate at which fluid can flow through the valve.

SUMMARY

It is an object of the invention to provide a valve in which at least some of the disadvantages with the known designs of gate valve are overcome or are of reduced effect.

According to the present invention there is provided a valve comprising a valve seat defining a first port and a second port, an angularly movable valve member having a first face and a second face, the valve member being movable between a closed position in which the first face thereof, or a valve element associated therewith, closes at least one of the ports and an open position, the valve member defining a first flow passage and a second flow passage, each flow passage communicating with a chamber defined, at least in part, by the second face of the valve member, wherein at least the first flow passage defines a flow director to impart a circumferential or tangential component to the fluid flow therethrough.

It will be appreciated that by imparting a circumferential or tangential component to the flow within the first flow passage, by the time the fluid has passed to the chamber its flow direction will already have started changing. The sharpness of the change in fluid flow direction can thus be reduced, thereby reducing the size of the restriction to fluid flow formed by the changes in fluid flow direction. By introducing a circumferential or tangential component to the flow direction, it will also be appreciated that the flow is directed around a shaft or spindle used to drive the valve member for movement.

Preferably, the flow director is defined by one or more surfaces defining the wall of the first flow passage. By way of example, the first flow passage may include a first opening arranged to communicate, in use, with the first port and a second opening communicating, in use, with the chamber, the first and second openings having different cross sectional shapes, and the wall of the first flow passage is shaped accordingly. Preferably, the second opening is of kidney-shaped formed. The first opening is preferably shaped to conform substantially with the shape and size of the first port so that fluid flowing from the first port passes directly to the first opening with minimal variation in flow pattern or characteristics when the valve is fully open. For example, the first port and first opening may take substantially the form of a segment of a circle, the apices of which are conveniently of rounded form. However, the invention is not restricted in this regard and may be applied to other forms of valve, for example those in which the first port and the first opening are of circular or substantially circular cross-sectional shape.

The second opening is conveniently located closer to the periphery of the valve member than the first opening. As a result, the sharpness of the change in fluid flow direction can be further reduced.

The second flow passage is conveniently similarly shaped to the first flow passage.

The first face of the valve member is conveniently shaped to define a pocket in which a gate button is received, the gate button bearing against the valve seat. The pocket and gate button are conveniently of substantially the same shape, but of larger dimensions than, the first port so that the gate button can completely overlie the first port and bear against a part of the valve seat surrounding the first port, when the valve member occupies its closed position.

Where the first port is of substantially the shape of a segment of a circle, then the pocket and gate button are conveniently correspondingly shaped.

BRIEF DESCRIPTION OF THE DRAWINGS

The invention will further be described, by way of example, with reference to the accompanying drawings, in which:

FIG. 2 is a view to an enlarged scale illustrating part of the valve;

FIG. 3 is a view similar to FIG. 2 illustrating the valve in an alternative operating position;

DETAILED DESCRIPTION OF THE DRAWINGS

Figure 1:
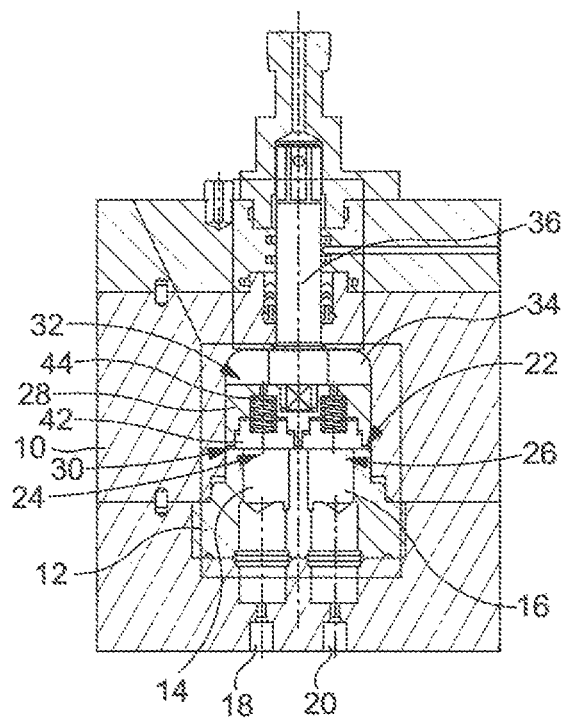
FIG. 1 is a cross-sectional view of a valve in accordance with an embodiment of the invention.
Figure 5:
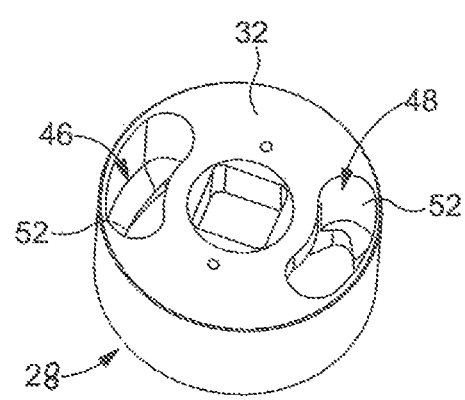
FIG. 5 is a view similar to FIG. 4 but illustrating the part of the valve from above.

Referring firstly to FIG. 1, a rotary gate vale is illustrated which comprises a valve housing 10 of multipart form and within which a seat member 12 is located. The seat member 12 includes a pair of passages 14, 16 which communicate with respective ports 18, 20 provided in the valve housing 10. Depending upon the application in which the valve is used, one of the ports 18 may comprise an inlet port and the other an outlet port. However, this need not always be the case and the invention is also applicable to applications in which fluid flow can be in either direction. The seat member 12 includes a seat surface 22, and at the point at which the passages 14, 16 open onto the seat surface 22, respective first and second ports 24, 26 are formed.

The valve housing 10 further contains a gate valve member 28 having a first surface 30 facing towards the seat surface 22, and a second surface 32 on an opposing end of the valve member 28. The second surface 32 defines, with part of the valve housing 10, a chamber 34. A spindle or shaft 36 is rotatably mounted upon the valve housing 10 and extends through the chamber 34 and into engagement with the valve member 28. The end part of the shaft 36 is of square cross section and mates with a correspondingly shaped recess formed in the valve member 28 such that angular movement of the shaft 36 drives the valve member 28 for corresponding angular movement.

The first surface 30 is formed with a pair of pockets 38. Each pocket is of substantially the shape of a right angled segment of a circle, the apices of which have been rounded. Within the base of each pocket 38 is a stepped, circular cross section recess 40. Each pocket 38 accommodates a correspondingly shaped gate button 42, the buttons 42 having parts shaped to correspond with the segment shaped part of the pocket, and parts shaped to conform with the stepped circular section parts. Springs 44 are provided between the valve member 28 and the gate buttons 42 to bias the buttons 42 into engagement with the seat surface 22.

The passages 14, 16 and first and second ports 24, 26 are of substantially the same cross sectional shape as the pockets 38 and gate buttons 42, but are of smaller dimensions with the result that when the valve member 28 occupies a closed position (as shown in FIGS. 1 and 2), the gate buttons 42 completely overlie the first and second ports 24, 26, sealingly engaging against parts of the seat surface 22 surrounding the first and second ports 24, 26. It will be appreciated that in this position fluid flow between the ports 18, 20 is not permitted.

The valve member 28 further includes first and second flow passages 46, 48 extending between the first and second faces 30, 32 thereof. At the ends thereof which open onto the first face 30, each passage 46, 48 includes a first opening 50 of shape and size substantially the same as the shape and size of the ports 24, 26. At the ends of the passages 46, 48 which open onto the second face 32 of the valve member 28, each of the passages 46, 48 includes a second opening 52 of substantially kidney shaped form. It will be appreciated, therefore, that the passages 46, 48 are not of uniform cross sectional shape, but rather that the cross sectional shapes thereof vary along the length of each passage 46, 48. In the arrangement illustrated this is achieved by the provision of angled parts of the passages 46, 48.

Figure 6:
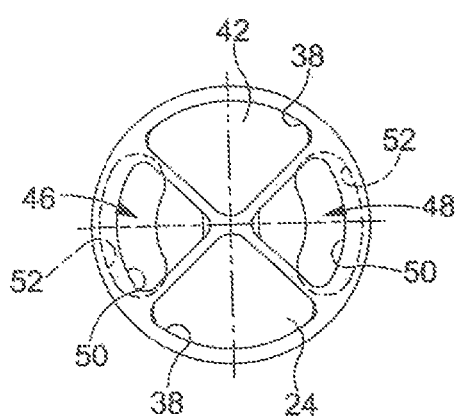
FIG. 6 is a diagram illustrating the part of the valve shown in FIGS. 4 and 5.
Figure 4:
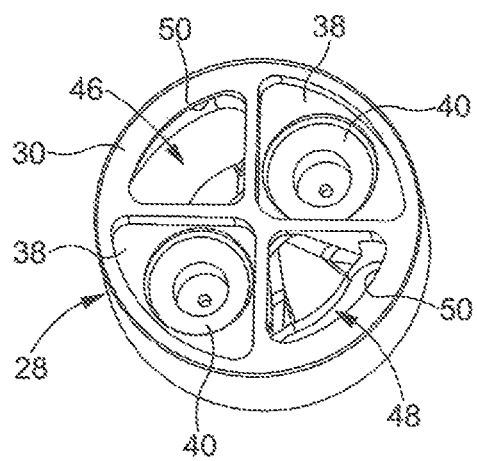
FIG. 4 is a perspective view of part of the valve from beneath.

As shown in FIG. 6, the openings 52 are of greater circumferential extent than the openings 50, and they are located closer to the periphery than the openings 50. The radial extent of the second openings 52 is smaller than the radial extent of the first openings 50. Whilst of different shapes to one another, the cross sectional area of the first and second openings 50, 52 are preferably substantially equal.

Figure 7:
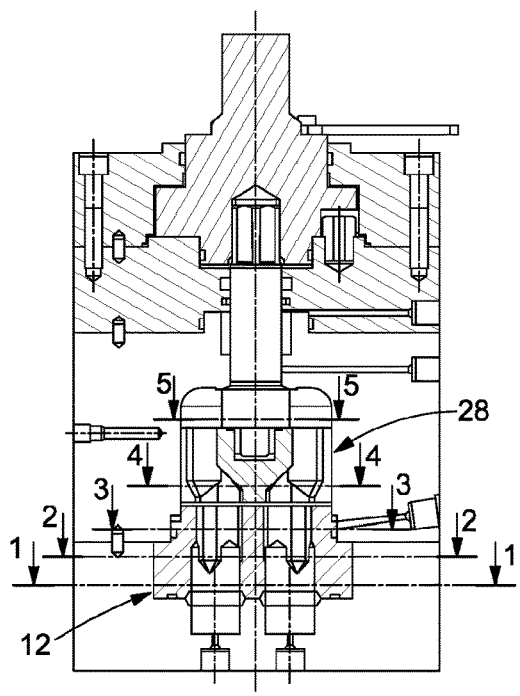
FIG. 7 is another view of the valve.
Figure 8A:
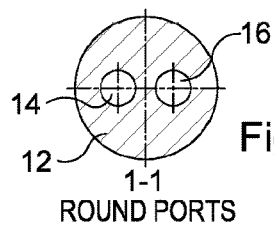
FIGS. 8a to 8e are sectional views along the lines 1-1, 2-2, 3-3, 4-4, and 5-5 in FIG. 7, respectively.
Figure 8B:
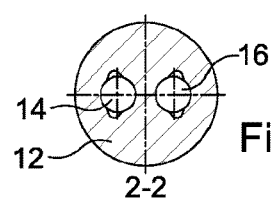
Figure 8C:
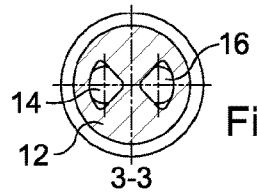
Figure 8D:
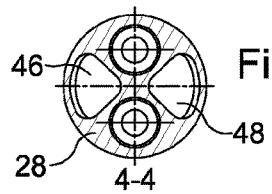
Figure 8E:
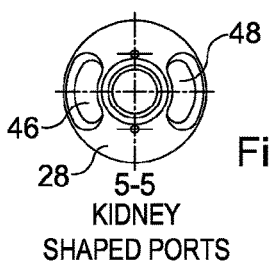

FIGS. 7 and 8 illustrate how the shapes of the passages 14, 16 and passages 46, 48 vary. As shown in FIGS. 7 and 8a, the lower parts of the passages 14, 16 are of circular cross-section, the shape gradually transitioning to a segment shape (see FIG. 8b) so that the ports 24, 26 are of segment shaped form. The lower parts of the passages 46, 48 are, likewise, of segment shaped form, taking substantially the same shape and size as the passages 14, 16 shown in FIG. 7c, and transitioning to a kidney shaped form (see FIG. 8e) at the opposite ends thereof. FIG. 8d illustrates the transition between these shapes, further showing that as part of the transition the passages 46, 48 become located more closely to the outer periphery of the valve member 28.

If the valve is moved from the closed position shown in FIGS. 1 and 2 towards a fully opening position, for example as shown in FIG. 3, it will be appreciated that the valve member 28 will move, angularly, with the result that the gate buttons 42 no longer completely overlie the ports 24, 26, and further movement results in the flow passages 46, 48 becoming aligned with the ports 24, 26. As soon as the gate buttons 42 no longer fully overlie the ports 24, 26, it will be appreciated that fluid is able to start to flow between the first port 24 and the chamber 34 via the first passage 46, through the chamber 34, and between the chamber 34 and the second port 26 via the second passage 48. In this position, therefore, fluid flow between the ports 18, 20 is permitted. It will be appreciated that the restriction to fluid flow formed by the valve will fall as the valve member 28 is moved towards its fully open position, as the restrictions to fluid flow between the ports 24, 26 and passages 46, 48 will fall.

In accordance with the invention, the shaping of the flow passages 46, 48 is such as to define a flow director surface or wall or walls 54 with which fluid can impinge, in use, and which serves to direct the fluid flowing along the passage 46, 48, imparting both a radial component thereto and a tangential or circumferential component thereto such that the fluid exiting the passages 46, 48 into the chamber 34 enters the chamber 34 adjacent the circumferential periphery thereof and flows through the chamber 34 following an arcuate path guided by the side wall of the chamber 34. Part of the change in flow direction will have already occurred before the fluid enters the chamber 34. As a consequence, the sharpness of the changes in the flow direction of the fluid flowing between the passages 46, 48 and the chamber 34 is reduced, and the flow is directed around the shaft 36. Accordingly, the restriction to fluid flow formed by the valve when fully open is reduced.

As the restriction to fluid flow formed by the valve when fully open is reduced, it will be appreciated that a smaller valve than would otherwise be required may be used in applications in which a given fluid flow rate is required. By reducing the size of valve, a number of other benefits may be attained. By way of example, a valve with a reduced diameter, and in particular with a reduced diameter valve member 28, typically requires a reduced level of torque to drive the valve member 28 thereof between its open and closed positions. Accordingly, the use of the invention may permit valves to be provided with smaller actuators.

The embodiment described hereinbefore represents just one embodiment of the invention and it will be appreciated that a wide range of modifications and alterations may be made thereto without departing from the scope of the invention.

The invention claimed is:

1. A valve comprising:
   a valve seat defining a first port and a second port; and
   an angularly movable valve member having a first face and a second face, the valve member being movable between a closed position in which the first face thereof, or a valve element associated therewith, closes at least one of the ports and an open position, the valve member defining a first flow passage and a second flow passage, each flow passage communicating with a chamber defined, at least in part, by the second face of the valve member, wherein each flow passage includes a first opening arranged to communicate, in use, with a respective one of the first and second ports and a second opening communicating, in use, with the chamber, the wall of each flow passage being shaped to define a flow director to impart a radial and circumferential or tangential component to the fluid flow therethrough relative to the valve member, wherein the second openings are of greater circumferential extent and smaller radial extent than the first openings, the first and second openings being of substantially the same cross sectional area as one another and having different cross sectional shapes to one another, the second opening being located closer to the periphery of the valve member than the first opening, and the walls of the flow passages being shaped accordingly.

2. The valve according to claim 1, wherein the second opening is of kidney-shaped formed.

3. The valve according to claim 1, wherein the first opening is shaped to conform with the shape and size of the first port.

4. The valve according to claim 3, wherein the first port and the first opening are each shaped as quadrants of a circle with rounded corners.

5. The valve according to claim 1, wherein the second flow passage is of a same shape as the first flow passage.

6. The valve according to claim 1, wherein the first face of the valve member is shaped to define a pocket in which a gate button is received, the gate button bearing against the valve seat.

7. The valve according to claim 6, wherein the pocket and gate button are of the same shape as the first port, but of larger dimensions than the first port so that the gate button completely overlies the first port and bears against a part of the valve seat surrounding the first port when the valve member occupies its closed position.

8. The valve according to claim 7, wherein the first port, the pocket, and the gate button are each shaped as a quadrant of a circle.

9. A valve comprising:
   a valve seat defining a first port and a second port; and
   a valve member having a first face and a second face, the valve member defining a first flow passage extending between a first opening in the first face and a second opening in the second face, and the valve member defining a second flow passage extending between a third opening in the first face and a fourth opening in the second face, the second face of the valve member at least partially defining a chamber, wherein the first opening and the second opening each have a same cross sectional area but different shapes, wherein the third opening and the fourth opening each have a same cross sectional area but different shapes, and wherein the first flow passage defines a flow director configured to impart radial and tangential components to fluid flowing therethrough;
   wherein the valve member is angularly moveable between an open position and a closed position, wherein the first flow passage communicates between the first port and the chamber only when the valve member is in the open position, and wherein the second flow passage communicates between the second port and the chamber only when the valve member is in the open position.

10. The valve according to claim 9, wherein the first opening is defined radially inwardly relative to the second opening, and wherein the third opening is defined radially inwardly relative to the fourth opening.

11. The valve according to claim 10, wherein the second opening is kidney-shaped.

12. The valve according to claim 10, wherein the first port has a cross sectional area and a shape that are the same as the cross sectional area and the shape of the first opening.

13. The valve according to claim 12, wherein the first port and the first opening are each shaped as quadrants of a circle with rounded corners.

14. The valve according to claim 10, wherein the first opening and the third opening have the same shape, and wherein the second opening and the fourth opening have the same shape.

15. The valve according to claim 10, wherein the first face of the valve member defines a pocket configured to receive a gate button such that the gate button bears against the valve seat.

16. The valve according to claim 15, wherein the gate button has a shape and a cross sectional area, wherein the shape of the gate button is the same as the shape of the first port, and wherein the cross sectional area of the gate button is greater than the cross sectional area of the first port such that the gate button completely overlies the first port and bears against a part of the valve seat surrounding the first port when the valve member is in the closed position.

17. The valve according to claim 16, wherein the first port, the pocket, and the gate button are each shaped as quadrants of a circle.

* * * * *